Dec. 25, 1923.
A. C. P. MOOIJ
1,478,753
SOWING MACHINE
Filed Jan. 17, 1920    3 Sheets-Sheet 1
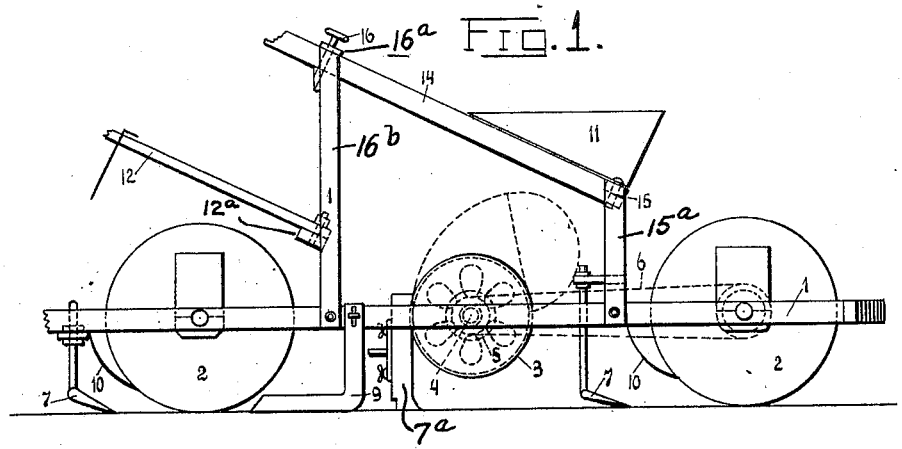
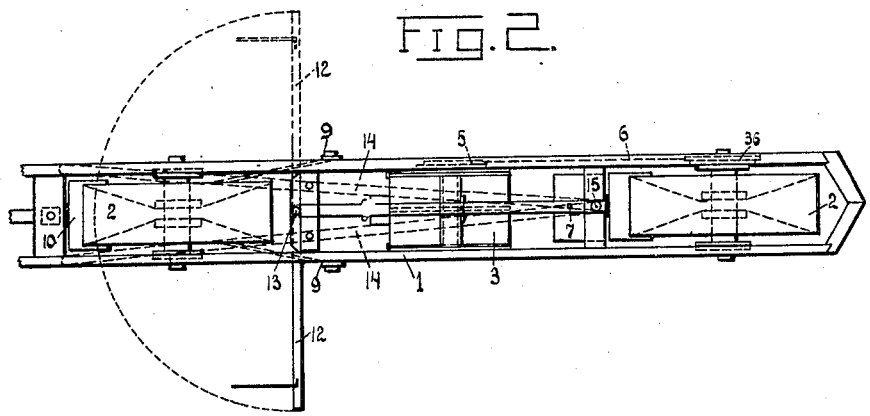

Dec. 25, 1923.

A. C. P. MOOIJ 1,478,753

SOWING MACHINE

Filed Jan. 17, 1920   3 Sheets-Sheet 2

Dec. 25, 1923.
A. C. P. MOOIJ
1,478,753
SOWING MACHINE
Filed Jan. 17, 1920   3 Sheets-Sheet 3
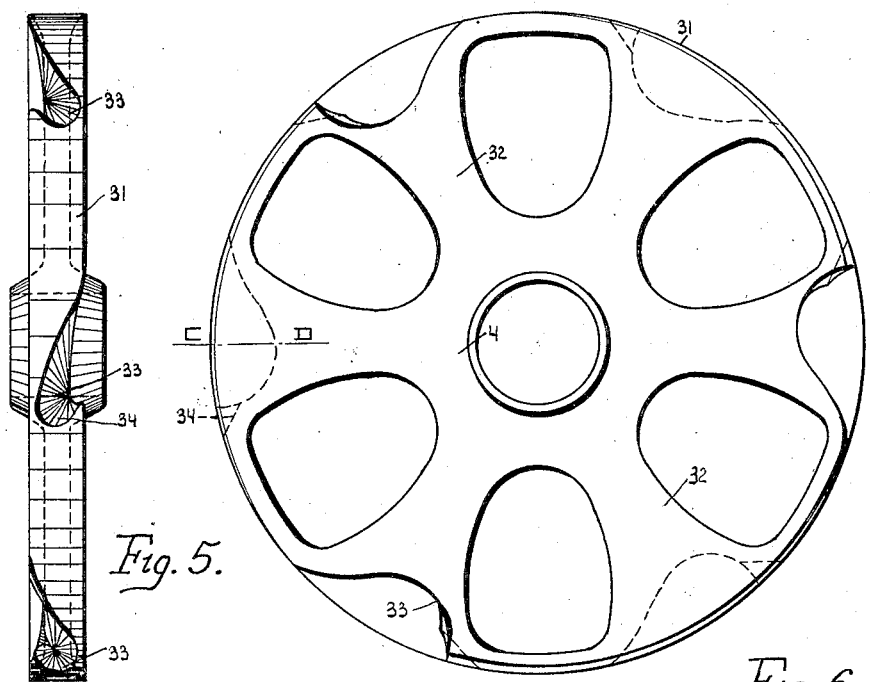
Fig. 5.
Fig. 6.
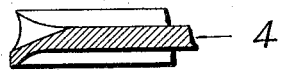
Fig. 7.
Inventor
Adriaan Cornelis Polman Mooij,
By B. Singer. Atty.

Patented Dec. 25, 1923.

1,478,753

UNITED STATES PATENT OFFICE.

ADRIAAN CORNELIS POLMAN MOOIJ, OF HEEMSTEDE, NETHERLANDS.

SOWING MACHINE.

Application filed January 17, 1920. Serial No. 352,211.

*To all whom it may concern:*

Be it known that I, ADRIAAN CORNELIS POLMAN MOOIJ, a citizen of the Netherlands, and resident at Heemstede, Netherlands, have invented certain new and useful Improvements in a Sowing Machine, of which the following is a specification.

This invention relates to improvements in planters and especially with reference to improvements in the construction of the seed dispensing mechanism, the object of the invention being to provide improved seed dispensing mechanism which is simple in construction, which may be adjusted for use in connection with seeds of various kinds, which is automatic in operation, and is not likely to get out of order.

With the above and other objects in view the invention consists in the construction, combination and arrangement of devices hereinafter described and claimed.

In the accompanying drawings:—

Fig. 1 is a side elevation of a planter provided with seed dispensing mechanism constructed and arranged in accordance with my invention.

Fig. 2 is a plan of the same.

Fig. 5 is an edge elevation of the seed wheel.

Fig. 6 is a side elevation of the same.

Fig. 7 is a detail section of the same taken on the plane indicated by the line C—D of Fig 6.

Figure 3:
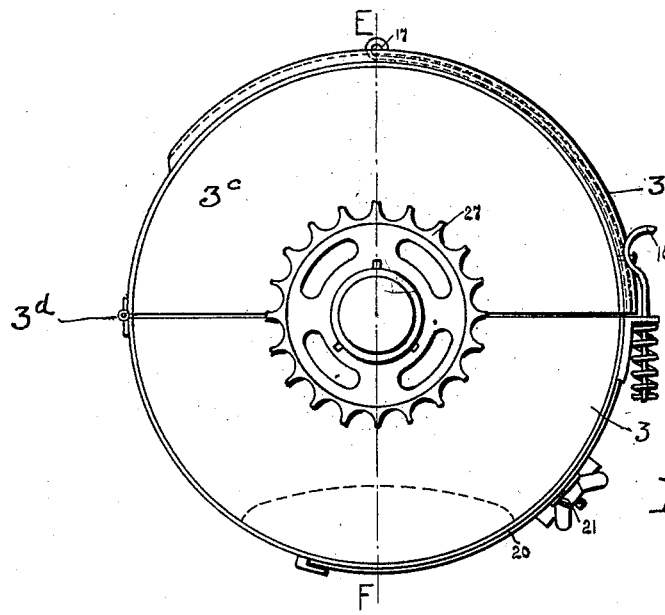
Fig. 3 is a detail elevation, of my improved seed dispensing mechanism.
Figure 4:
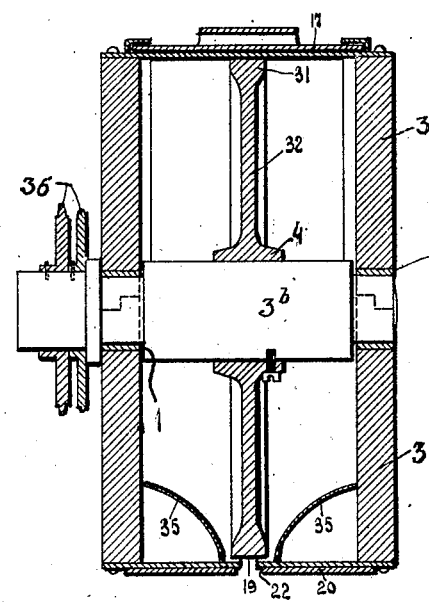
Fig. 4 is a transverse sectional view of the same on the plane indicated by the line E—F of Fig. 3.

For the purposes of this specification, a planter is shown in Figs. 1 and 2 of the drawings, embodying a pair of longitudinal bars 1, broad wheels or rollers 2 the axles of which are mounted in bearings in said bars, said wheels being arranged between the bars, a pair of handles 14 which are pivotally connected at their front ends as at 15 to suitable uprights 15ª, and are adjustably secured by a pin 16 to a cross bar 16ª at the upper ends of uprights 16ᵇ, a marker 12 which is pivotally connected to a cross bar 12ª and may be swung to either side of the machine, front and rear furrow openers 7, and a seed spout or shoe 7ª. Coverer sweeps 9 are also provided, as shown. A receptacle 11 for seeds is arranged on the front portions of the handles. Within the scope of the invention the planter mechanism may be of any suitable construction.

A circular seed box 3 is arranged between the bars 1 at a point between the wheels 2, and secured against rotation, and is provided with an axle 3ᵇ which is mounted in bearings in the bars 1. A sprocket wheel 27 is secured to said axle and connected by a chain indicated in dotted lines at 6, Figs. 1, 2, to a sprocket wheel 36 on the axle of the front wheel 2.

The circular seed box 3 is fixed and is provided with a hinged upper portion 3ᶜ the hinge of which is indicated at 3ᵈ. A suitable spring actuated hook 18 is provided to secure said hinged portion in closed position. The upper portion of the circular wall of the seed box has an opening and a slide 17 is provided to close said opening when required. In the bottom of the seed box is a medially arranged slot 19. A transversely movable slide 20 is provided having an opening 22 which opening or slot 22 by gradual movement of said slide may be moved into coincidence with the slot 19 to any desired extent to either entirely open or else partially close said slot 19 as may be desired and by approximately moving said slide 20 said slot 19 may be entirely closed.

A bolt having a winged nut 21 is here indicated as means for locking the slide 20 in any desired position. Any suitable means may be used for this purpose. Rows of perforations may be substituted for the slot 19 and may be of any suitable size or various sizes according to the sizes of the different seeds to be sown. If beans are to be sown the lid 3ᶜ will be kept open, the slide 20 adjusted to close the slot 19 and beans when the machine is in operation will be thrown by the revoluble wheel 4 over the sowing ledge of the slot portion of the seed wheel 4 and into the spout or chute 7ª. A wheel 4 is rotated when the machine is in motion by the sprocket wheels 5, 36 and chains 6 as will be understood. In the lower portion of the seed box 3 is a slot 22 of suitable length and width. An adjustable slide 20 is provided to close and open said slot. Said slide can be locked in any desired position by any suitable means such as a bolt 21 which has a winged nut 20. Rows of perforations may be substituted for the slot 22, and may be of any suitable size or of various sizes according to the sizes of different seeds to be sown. If beans are to be sown the lid 3ᶜ will be kept open, the slide adjusted to close the slot 22 and the beans when the machine is in operation will be thrown by the revoluble seed wheel 4 over the sowing edge of the lower portion of the seed box 3, and into the spout or shoe 7ª. In practice, when small seeds are to be sown, the wheel 4 may be provided with suitable peripheral pins to press the seeds through the slot 19, when the latter is open, or through the openings provided in lieu of said slot, as hereinbefore indicated. Segmental inclined plates 35 are arranged in opposite sides of the lower portion of the seed box 3 on opposite sides of the slot 19, to guide the seeds to said slot 19 and to said seed wheel 4.

Said seed wheel comprises a hub member, a disk 32 which forms spokes, and a broadened rim or peripheral member 31. The periphery of said seed wheel is provided with seed receiving and ejecting pockets 33 which open alternately on opposite sides of said seed wheel, each of which has an outwardly and downwardly directed inclined surface 34 along which surface the seeds as they are moved upwardly by the rotation of the seed wheel will slide downwardly. The inclination of said surface is such that at the delivery end of each pocket its axis makes a sharp angle with the tangent at the circumference at that place, or in other words, the axis of the pocket would, if inwardly prolonged, never intersect the axis of rotation of the wheel.

It will be observed upon reference to the drawings and understood from the foregoing description, that by such construction of the seed wheel with its pockets injury to the seeds is prevented. When the machine is in operation, even sowing of the seed is realized by the seed wheel moving quite close to the bottom of the drum shaped seed receptacle. The seed is taken along by means of the pockets on the wheel and are discharged when the slide 17 is opened, the seed moving through the slot 7 into the seed spout or shoe 7ª. For sowing certain kinds of seeds, the slot 19 and slide 22 are employed, said slide being arranged in the required position to open said slot and permit the passage of seeds, from the bottom of the seed box, through said slot and thence into and through the shoe 7ª, as will be understood, the upper portion of the chute being open and being adjusted to the slot 19.

Having thus described my invention, I claim:—

1. The combination of a seed receptacle having a semi-cylindrical wall and a feed wheel having pockets in its outer periphery cooperating with the wall to raise seeds to the top of the wall, the pockets being so shaped that when the seed is carried above the wall, the seeds will drop out, the said feed wheel cut away along the outer periphery in front of the pockets to permit seeds to accumulate in front of the pockets.

2. The combination of a seed receptacle having a semi-cylindrical wall and a feed wheel having pockets in its outer periphery cooperating with the wall to raise seeds to the top of the wall, the pockets being so shaped that when the seed is carried above the wall, the seeds will drop out, the feed wheel being cut away in front of the pockets alternately from each side of the wheel to ensure feeding of seeds to the pockets and from opposite sides of the wheel.

In testimony whereof I have signed my name to this specification, in presence of the two subscribing witnesses.

ADRIAAN CORNELIS POLMAN MOOIJ.

Witnesses:
 F. CRONE,
 H. VERHEIJ.